US008267799B2

(12) United States Patent
Schnaedelbach et al.

(10) Patent No.: US 8,267,799 B2
(45) Date of Patent: Sep. 18, 2012

(54) DEVICE FOR DAMPING VIBRATIONS

(75) Inventors: David Schnaedelbach, Buehl (DE); Christian Huegel, Rheinau (DE); Stefan Jung, Kehl (DE); Eugen Kombowski, Buehl (DE); Christian Dinger, Lauf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/094,350

(22) Filed: Apr. 26, 2011

(65) Prior Publication Data

US 2011/0201433 A1    Aug. 18, 2011

Related U.S. Application Data

(63) Continuation of application No. PCT/DE2009/001341, filed on Sep. 24, 2009.

(30) Foreign Application Priority Data

Oct. 27, 2008  (DE) .......................... 10 2008 053 371

(51) Int. Cl.
*F16F 15/121* (2006.01)
(52) U.S. Cl. .................................. 464/67.1; 192/213.2
(58) Field of Classification Search ............... 464/67.1, 464/68.8, 68.1, 68.9, 68.92; 192/205, 213.2, 192/70.17, 55.61
See application file for complete search history.

(56) References Cited

U.S. PATENT DOCUMENTS

| 4,702,721 | A | * | 10/1987 | Lamarche ................ 464/67.1 |
| 4,890,706 | A | * | 1/1990 | Miura et al. | |
| 5,141,474 | A | * | 8/1992 | Fujimoto ................... 464/67.1 |
| 5,224,576 | A | * | 7/1993 | Fujimoto ................. 464/67.1 X |
| 5,713,442 | A | * | 2/1998 | Murata et al. .......... 192/213.2 X |
| 5,752,884 | A | * | 5/1998 | Yabe et al. | |
| 5,772,515 | A | * | 6/1998 | Yamakawa et al. ....... 192/205 X |
| 5,810,140 | A | * | 9/1998 | Billet et al. ................ 192/205 X |
| 5,813,506 | A | * | 9/1998 | Maeda et al. .......... 192/213.2 X |
| 5,868,228 | A | * | 2/1999 | Fukushima ............... 192/205 X |
| 5,899,311 | A | | 5/1999 | Yamamoto et al. | |
| 5,941,354 | A | * | 8/1999 | Fukushima et al. ..... 464/68.1 X |
| 6,106,400 | A | * | 8/2000 | Mizukami ................. 464/68.92 |
| 6,257,383 | B1 | * | 7/2001 | Ohkubo et al. ........... 192/205 X |
| 6,273,227 | B1 | * | 8/2001 | Ohkubo ................... 192/205 X |
| 6,354,420 | B1 | * | 3/2002 | Yabe | |

(Continued)

FOREIGN PATENT DOCUMENTS

DE         19912970        9/1999

*Primary Examiner* — Gregory Binda
*Assistant Examiner* — Matthieu Setliff
(74) *Attorney, Agent, or Firm* — Simpson & Simpson, PLLC

(57) ABSTRACT

A device for damping vibrations comprising at least two coaxially arranged damper parts rotatable relative to each other to a limited extent in the circumferential direction, coupled by torque transmitting means and damping coupling means, which exhibit at least one energy accumulator unit, and forming the impingement areas for the energy accumulator units. At least one damper part forms a guide channel for the energy accumulator units. The individual impingement area on the damper part forming the guide channel for the energy accumulator units is formed by a stop element, connected in a torsion proof manner at least indirectly to the damper part and forms the abutment faces in the guide channel in the circumferential direction. The abutment face is capable of supporting the energy accumulator unit on both sides of the impingement area on the energy accumulator unit and is a part of the other damper part.

23 Claims, 5 Drawing Sheets

U.S. PATENT DOCUMENTS

| | | | |
|---|---|---|---|
| 6,467,595 B2 * | 10/2002 | Yabe et al. | 464/67.1 X |
| 6,866,129 B2 * | 3/2005 | Tomiyama | |
| 6,938,744 B2 * | 9/2005 | Tomiyama | |
| 7,543,694 B2 * | 6/2009 | Arhab et al. | 192/70.17 X |
| 7,699,150 B2 * | 4/2010 | Frey et al. | 192/70.17 X |
| 7,753,183 B2 * | 7/2010 | Parks et al. | 192/70.17 X |
| 7,784,595 B2 * | 8/2010 | Bauer et al. | 192/55.61 |
| 7,934,588 B2 * | 5/2011 | Tsuboi et al. | 464/67.1 X |
| 2001/0035321 A1 * | 11/2001 | Yabe et al. | 192/55.61 X |
| 2006/0288815 A1 * | 12/2006 | Uhler et al. | |
| 2007/0199787 A1 * | 8/2007 | Graf et al. | 192/55.61 |
| 2009/0090593 A1 * | 4/2009 | Mu et al. | 192/213.2 |

\* cited by examiner

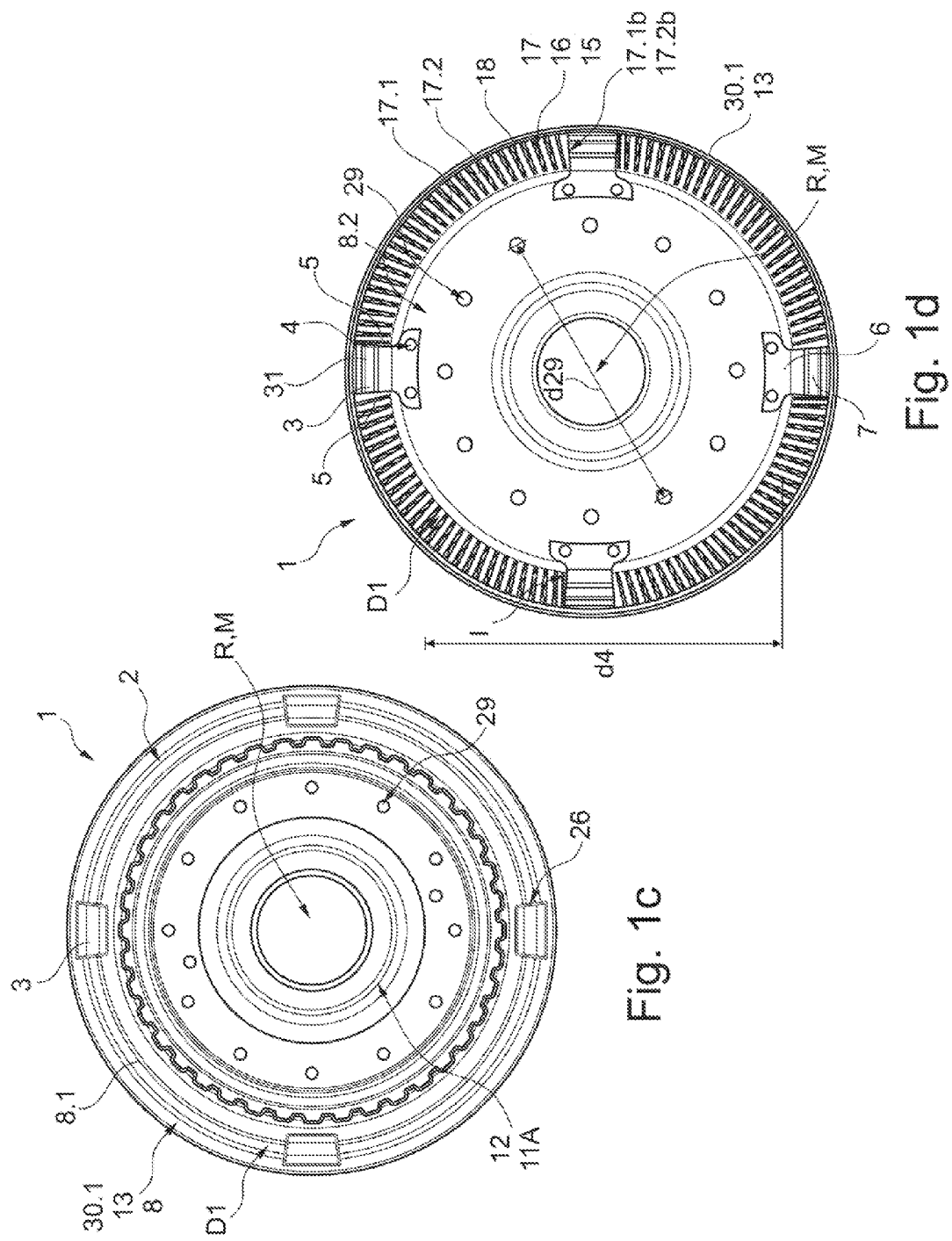

DEVICE FOR DAMPING VIBRATIONS

CROSS-REFERENCE TO RELATED APPLICATIONS

This application is filed under 35 U.S.C. §120 and §365(c) as a continuation of PCT International Patent Application No. PCT/DE2009/001341 filed Sep. 24, 2009 which application claims priority from German Patent Application No. 10 2008 053 371.8 filed Oct. 27, 2008 which applications are incorporated herein by reference in their entirety.

FIELD OF THE INVENTION

The invention relates to a device for damping vibrations with at least one damper arrangement, comprising at least two damper parts, which are arranged coaxially to each other and can be rotated relative to each other to a limited extent in the circumferential direction. The damper parts are coupled to each other by way of torque transmitting means and damping coupling means, which exhibit at least one energy accumulator unit. The damper parts form the impingement areas for the energy accumulator units. At least one of the damper parts forms a guide channel for the energy accumulator units.

BACKGROUND OF THE INVENTION

The prior art discloses a wide variety of designs for device that are used for damping vibrations. For example, a design conforming to this genre is described in the document DE 199 12 970 A1. This document discloses a device for damping vibrations with at least two damper parts that can be rotated counter to the resistance of at least one energy accumulator. Moreover, these damper parts have impingement areas for compressing the energy accumulator units. The energy accumulator units are constructed in the form of bow spring units—in particular, so-called helical compression springs—that are characterized by the fact that their extension in the longitudinal direction, which matches their extension in the circumferential direction, exhibits at least two different types of windings having different outside diameters—that is, a first larger outside diameter and a second smaller outside diameter. Conceivable are also designs with spring units that are arranged one inside the other. One of the rotatable damper parts forms an annular chamber and/or defines it at least partially in the circumferential direction. The energy accumulators are guided in said chamber in both the radial and also the axial direction. For this purpose the damper part that has the guide chamber is configured as a driver disk; and the other damper part is configured as a flange with drivers that are oriented in a radial direction and form the impingement areas for the energy accumulator units.

The use of bow springs makes it imperative to integrate, as described above, the stops, which form the abutment faces facing in the circumferential direction, either in the guide channel for the energy accumulators—that is, either formed directly on the respective structural elements during the shaping process; or these stop are connected as separate elements, which extend into the guide channel in a radial direction and are connected by riveting, for example to the corresponding damper part.

The design of the driver disk with an integrated stop is always used predominantly when a flange having a projection, which is oriented in an axial direction, is used as the input part of the device for damping vibrations. In order to then achieve an adequate abutment face even in the design with internal springs for such a stop, the driver disk is characterized by a complex geometry that is relatively time consuming to produce and, therefore, associated with high costs.

Furthermore, this type of stop can be achieved only on one side of the driver disk. However, the limiting factor with respect to the shaping is the limited deformability of the material used for this process. In the case of energy accumulator units consisting of springs that are arranged so as to be nested one inside the other, so that the external springs exhibit a large wire diameter, it is no longer possible to produce a correspondingly large abutment face for the internal spring. Therefore, it is necessary for designs of this type to use so-called end caps (that is, elements forming stop faces) that are guided in a moveable manner in the guide channel for the energy accumulator units, are supported on the damper parts and form a stop for the respective end region of the energy accumulator.

From a manufacturing viewpoint with respect to the integrated design, impressions can be provided only in the punch direction, so that this kind of stop is limited to variants with flanges that engage radially from the inside.

If for manufacturing reasons it is not possible to form the stops, forming the abutment faces, directly from the walls of the individual components, then it becomes necessary to use separate stop elements that are then usually connected to the driver disk, which in turn is generally connected to a multi-disk carrier of a shiftable clutch system on the drive side.

Other designs with a guide channel that is formed by a damper part, forming an input part of a damper arrangement, in the form of the driver disk are characterized by a stop that is riveted to said driver disk and that is arranged between the input part and the other damper part forming the output part. However, in this case it would be necessary to additionally stamp on the driver while simultaneously forming the respective stop regions, in order to be able to also take along the energy accumulator unit on two sides. That is, in the case of energy accumulator arrangements with springs that are nested one inside the other, the internal springs can be activated only to a limited extent by way of the abutment face. As a rule, this solution is then also expanded to include separate stop elements.

BRIEF SUMMARY OF THE INVENTION

Therefore, the object of the invention is to further develop a vibration damping device of the type that is described in the introductory part with energy accumulator systems, in particular in the form of spring units, which are arranged one inside the other and which are formed by an external spring and an internal spring, in such a way that the said drawbacks are avoided and adequately large support surfaces can be provided for said springs. Thus, there is no need for the elements that form the abutment faces, can be moved in the guide channel and are supported on the damper parts. At the same time the aim is provide an arrangement that minimizes the required design space, is easy to assemble and is inexpensive to produce.

The inventive device for damping vibrations with at least one damper arrangement, includes at least two damper parts, which are arranged coaxially to each other and can be rotated relative to each other to a limited extent in the circumferential direction. The damper parts being coupled to each other by way of torque transmitting means and damping coupling means, which exhibit at least one energy accumulator unit. The damper parts form the impingement areas for the energy accumulator units. At least one of the damper parts forms a guide channel for the energy accumulator units, and is characterized by the fact that the individual impingement area on the damper part forming the guide channel for the energy accumulator units is formed by a stop element, which is connected in a torsion proof manner at least indirectly to said damper part and forms the abutment faces for the energy accumulator units. The abutment face is configured and arranged so as to be capable of supporting, when viewed in the axial section, the energy accumulator unit on both sides of the impingement area that is active on this energy accumulator unit and is a part of the other damper part.

The inventive device assigns the functions of the abutment face to a separate component, which is connected at least indirectly to the guide channel for the energy accumulator units, and offers the advantage of a uniform support for the end regions of the energy accumulator units over their whole surface area, so that the forces are introduced uniformly. The energy accumulator units do not require any additional measures for stabilizing their guidance in the circumferential direction. Furthermore, owing to the use of separate stop elements and the forming of their abutment faces, it is possible to achieve a wide variety of damper configurations with the same damper part, forming the guide channel for the energy accumulator units, in particular with respect to the design and shape of the respective other damper part. In particular, the design and orientation of the impingement areas of the drive elements of the respective other damper part, which does not have the guide channel for the energy accumulator units, can vary. Furthermore, there is the possibility of freely adapting the abutment face to the application requirements, especially with respect to the dimensions and the geometry, without adversely affecting the impingement areas, in order to guarantee an adequate support of the individual energy accumulator units, especially in the design of spring units that are arranged radially one inside the other.

The individual abutment face is configured in relation to the cross sectional area of the guide channel, viewed in the axial section, so as to extend over a subarea thereof in the circumferential direction. In this case the abutment face in its first design can be adapted directly to the contour of the guide channel. As a result, the stop element can be then formed in such a way that the outer circumference of the stop element rests against the internal circumference of the damper part in the guide channel in the region forming the abutment face. In an example embodiment, the abutment face exhibits geometric designs that are easy to manufacture and support a large area of the energy accumulator while simultaneously forming a connecting region for guiding the impingement areas of the respective other damper part. In an example embodiment, the geometric shape of the abutment face can be described by at least two or at least three surface areas that are oriented at an angle in relation to each other. In one advantageous design these surface areas can be configured in conformity with one of the following listed shapes: L shaped, C shaped, U shaped, F shaped, V shaped, where the individual surface legs can be configured so as to be straight or also curved.

In an example embodiment, the stop element advantageously is designed as a formed part, for example, as a sheet metal formed part because of the ease of production, and includes at least one stop and support region for forming at least one abutment face, facing in the circumferential direction, and a connecting region for connecting in a torsion proof manner at least indirectly to the damper part forming the guide channel for the energy accumulator units. In an example embodiment, the stop element advantageously has two abutment faces that are oriented opposite each other in the circumferential direction. The stop and support region, which forms the abutment face, in particular both abutment faces that are oriented opposite each other in the circumferential direction, is designed and arranged with respect to the geometric shape and dimensions in such a way that this stop and support region releases a guide region for the impingement areas of the respective other damper part between two energy accumulator units, which are arranged one after the other in the circumferential direction. The impingement areas are formed by themselves as a function of the orientation of the stop element profile with the open side in the axial or radial direction or in an angular orientation to the rotational axis by axial or radial or also angularly oriented driver elements, in particular projections on a flange component.

In an example embodiment, the damper part, forming the guide channel for the energy accumulator units, advantageously has breakthroughs/recesses, which are arranged so as to be spaced apart from each other in the circumferential direction in the region forming the guide channel. In this case the stop element can be inserted into said breakthroughs/recesses, so that in the installation position the stop and support region extends at least partially through the breakthroughs/recesses. In an example embodiment, the stop and support region is advantageously configured so as to be adapted to the contour of the wall of this damper part that is missing in these regions, in order to optimize the use of the design space.

In an example embodiment, the stop element according to the invention is connected in a torsion proof manner directly to the damper part. The embodiment offers the advantage that the device for damping vibrations can be configured with respect to the connection to be carried out with the connecting element independently of the type of stop element. The stop element is connected independently of the connecting environment for the device for damping the vibrations. With respect to the torsion proof connection to the respective damper part there are basically two different possibilities that have an effect on the construction method for the stop element and are characterized by the connection to an internal side of the device for damping vibrations or to an end face describing an external side. Conceivable are also force locking or form locking or material bonding connections. In an example embodiment, the stop element is advantageously constructed as a sheet metal formed part, comprising the stop and support region, forming the stop faces in the circumferential direction, and a connecting region. In the installation position the connecting region is arranged below the support region in a radial direction. The support region is formed by a curved sheet metal element, which can be described, when viewed in the cross section or in a sectional plane, which is characterized by the axes of rotation and a perpendicular to said sectional plane, by an essentially C or U shaped cross section, which makes it possible to support a large portion of the spring unit in the circumferential direction. In the simple C shape design with the formed flange region in a radial direction, the connecting region is coupled to the end side of the damper part that faces away from the actual connecting region of a connecting element, and thus, in the interior of the device for damping vibrations, in particular between the two damper parts in the axial direction. As a result, the connection of the stop element does not require any additional design space; and this design space can be incorporated into the construction in a space saving way.

In an example embodiment, a torsion proof connection occurs with an element that is connected in a torsion proof manner to the damper part. The connection is advantageously arranged on the end side of the respective damper part that forms the connecting region with the connecting element. This design is advantageous for forming the other damper part with drivers oriented in a radial direction. The stop element is coupled in a torsion proof manner directly with the connecting element that is to be connected to the respective damper part in any event. The connection occurs in an especially advantageous manner on a common diameter, like the connection between the damper part and the connecting element. For this purpose, however, it is necessary that the respective damper part exhibits corresponding punch-outs or more specifically passage openings that allow the connecting region of the stop element to be guided through said passage openings and, thus, to be arranged in a plane in the connecting region of the damper part. Then the breakthroughs/recesses for arranging the connecting region of the stop element in the damper part are configured preferably in such a way that they also form the breakthroughs/recesses that are disposed in the guide channel for the energy accumulator units.

The individual torsion proof connections between the stop element and the component, which is connected in a torsion proof manner to the damper part, and the torsion proof connection between the damper part and the component, which is to be connected in a torsion proof manner to said damper part in the circumferential direction, are arranged alternatingly and advantageously, in an example embodiment, on a common arrangement diameter, in order to be able to produce them in a single working step.

In an example embodiment, the individual torsion proof connections are advantageously constructed as a positive, or form locking, connection—for example, a riveted connection. In an example embodiment, the components are advantageously connected to each other already have rivet pins.

In an example embodiment, the damper part forming the guide channel is formed by the input part of a damper arrangement in the force flow. This damper arrangement may involve the input of the entire device. Then the other damper part is constructed as a flange, which has drivers in the form of flange tongues that are formed as a function of the orientation of the stop face of the oriented projections and can be guided in an engaging manner in the intermediate space, which is formed by the stop element and which forms a connecting channel. In an example embodiment, the flange exhibits projections, as the drivers that are oriented in an axial direction. The stop element is configured in the shape of a C in the support region, so that the flange extends into the guide channel on the open side. In order to achieve additionally large impingement areas on the flange, the support region of the stop element extends preferably through the breakthrough on the damper part. Then the drivers of the flange can be configured over the entire extension of the energy accumulator units in the extension direction of the drivers of the flange, in order to form large surface areas.

In an example embodiment, the stop element has support means, forming a support region, for the radial support of the energy accumulator units. In an example embodiment, the support means advantageously are an integral part of the stop element. As a result, the stability of the stop element can be increased.

The design according to the invention is especially applicable to designs of energy accumulator units that are formed by spring units, for example, bow springs. In this context it is possible to use single springs, spring units exhibiting windings having different diameters in the longitudinal direction of the springs and spring units comprising springs that are arranged radially one inside the other and exhibit different diameters.

BRIEF DESCRIPTION OF THE SEVERAL VIEWS OF THE DRAWING

The inventive solution is explained below with reference to the figures. The figures show in detail the following:

FIGS. 1a-1d show an inventive device for damping vibrations in a plurality of views;

DETAILED DESCRIPTION OF THE INVENTION

Figures 1A, 1B:
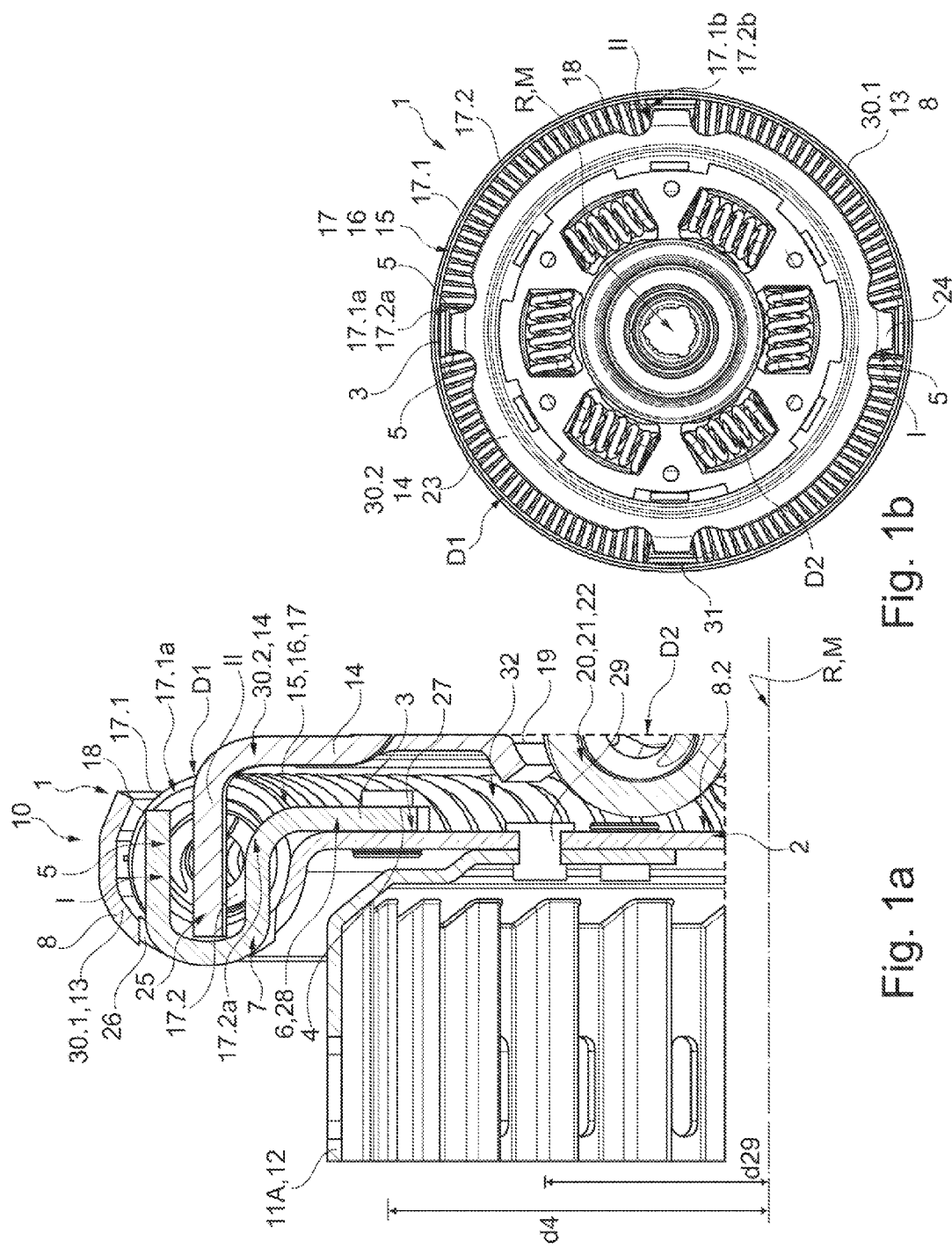

FIG. 1a shows a detail from an axial view of a force transmitting device 10 comprising an inventive design of a device 1 for damping vibrations. When this inventive device is used in force transmitting devices 10, it is downstream thereof between a drive and a downstream output, for example a transmission of a shiftable clutch system 11 in the force flow from the drive to the output. The device 1 for damping vibrations serves to compensate for the rotational non-uniformities introduced by the drive and, moreover, for the torque transmission, for which reason it is also referred to as an elastic clutch. To this end, the device 1 for damping vibrations is coupled to the shiftable clutch system 11, in particular to the second clutch member 11A, which is constructed as the output of the shiftable clutch system 11 in the force flow from the drive to the output. FIG. 1 does not show the entire shiftable clutch 11, but rather only a portion of the second clutch member 11A in the form of a multi-disk carrier 12, in particular, its connecting region with the device 1. This multi-disk carrier is provided as a friction locking clutch in the design. The figure shows only a detail from an axial section above an axis of rotation R. The directional data relates to the reach of the axis of rotation in the installation position of the device 1. The radial direction matches the direction perpendicularly to the axis of rotation. The circumferential direction matches the direction in the circumferential direction about the axis of rotation R.

The device 1 for damping vibrations is characterized by at least one damper arrangement D1—in the illustrated case, by two damper arrangements D1 and D2. Conceivable are also designs with a plurality of damper arrangements D1 to Dn, which can be combined in different ways, for example, can be connected in series and/or in parallel to each other. Each of the individual damper arrangements D1 to Dn has at least a first and a second damper part, both of which assume, when viewed in the force flow direction, the functions of an input and an output part. In designs with a plurality of damper arrangements D1 to Dn the individual damper parts can be a part of a plurality of damper arrangements D1 to Dn. The individual damper parts can be configured so as to be one piece or multiple pieces and are coupled together in each case by means for transmitting the torque and by means for coupling the damping. In this context the damper parts of a damper arrangement can be rotated relative to each other to a limited extent in the circumferential direction.

In the design shown in FIG. 1a, the device 1 for damping vibrations has two damper parts 30.1 and 30.2, which can be rotated about the axis of rotation R, for the radially outer damper arrangement D1. Said damper parts are arranged coaxially to each other and can be rotated relative to each other about the axis of rotation R to a limited extent in the circumferential direction and are coupled to each other by means 15 for transmitting the torque and by means 16 for coupling the damping. In an example embodiment, the means 15 for transmitting the torque and the means 16 for coupling the damping are formed by the same components. In the illustrated case they comprise energy accumulator units 17, preferably in the form of bow spring units, which are formed by two spring units, which are nested one inside the other in the longitudinal direction, an external spring unit 17.1 and an internal spring unit 17.2. The individual spring units 17.1 and 17.2 are arranged so as to be approximately concentric in relation to each other. The individual damper parts 30.1 and 30.2 have impingement areas I and II, which form the abutment faces 5 and are, for example, for compressing the energy accumulator units 17. These abutment faces are active on the end regions 17.1a, 17.1b, 17.2a, 17.2b of the energy accumulator units 17. These end regions are oriented in relation to each other so as to be opposite one another in the longitudinal extension direction of the individual energy accumulator units 17 in the installation position in the circumferential direction.

This figure shows for the second damper step D2 only one damper part, which acts as the input part 19 in the force flow, as well as the means 20 for transmitting the torque and 21 for coupling the damping, in the form of energy accumulator units 22. In this case the input part 19 is formed by the output part 14 of the first damper arrangement D1. At the same time the input part 13 of the damper arrangement D1 forms the input, which is called the damper input 2, of the whole device 1 for damping vibrations, when viewed in the force flow from the drive to the output by way of the force transmitting device 10.

The end regions 17.1a, 17.1b, 17.2a, 17.2b of the individual energy accumulator units 17 or 19 respectively are supported in the circumferential direction on the impingement areas I, II at least on the respective input part 13 or 19 respectively and on the output part 14. In particular, the use of energy accumulator units 17 having larger diameters presents the problem of an adequate and, if possible, uniform support of the surface areas on the respective damper parts 30.1, 30.2 that face in the circumferential direction. Since this problem exists especially at the outer damper arrangement D1 facing in a radial direction, the inventive solution for this problem is explained below.

The energy accumulator units 17 are guided in so-called guide channels 18 on at least one of the damper parts 30.1, 30.2, herein 30.1 in the form of the input part 13. This input part involves an annularly configured space, which extends about the axis of rotation R in the circumferential direction and is intended for accommodating the energy accumulator units 17, which are arranged one after the other in the circumferential direction. This space is formed at least partially by the contour of the respective damper part 30.1 while simultaneously forming the wall areas defining the space. However, the wall of the individual damper part 30.1 does not completely enclose the guide channel 18, because the drivers or the flange regions of the respective other damper part 30.2 have to engage with this guide channel. Therefore, the invention provides a separate stop element 3, which forms the abutment faces 5 and which is connected in a torsion proof manner at least indirectly to the damper input 2, in order to form very large abutment faces 5, which are adapted to the bearing surface of the individual energy accumulator units 17, for the impingement area I while simultaneously avoiding a costly forming of the damper part 30.1, by way of which the force is introduced. "At least indirectly" means that the coupling ensues directly or indirectly by way of additional elements that are connected in a torsion proof manner thereto. As a result, the individual stop element 3 forms two abutment faces 5, which point away from each other and which point inside the device 1 in the circumferential direction. The stop element 3 is constructed as a formed part, in particular a sheet metal formed part, which forms the abutment faces 5 on its end side pointing in the circumferential direction. The shape of the individual abutment face 5 and, thus, the stop and support region 7 forming said abutment face is selected in such a way that this abutment face is appropriate for enabling a support of the individual energy accumulator units 17 on the respective end regions 17.1a, 17.1b, 17.2a, 17.2b, in particular a support of the spring surface areas 17.1a, 17.1b, 17.2a, 17.2b that are to be supported and are formed by the end winding. The individual abutment face 5 is formed in such a way that it forms at least a plurality of support surface areas for a subarea of these spring surface areas. For this purpose the abutment face 5 extends in the installation position in the circumferential direction about the longitudinal axis of the energy accumulator unit 17 parallel to the abutment face, formed by the end winding—that is, on the end region of the energy accumulator unit 17 by way of at least one subarea in the circumferential direction, in order to support the energy accumulator unit 17 on both sides of the possible impingement area II by means of the other damper part 30.2, herein 14. With respect to the guide channel 18, the stop element 3, forming the abutment face 5, extends in the form of a ring segment in the region of the outer circumference of the guide channel 18 in the circumferential direction for the purpose of forming a flat, but formed abutment face 5 while simultaneously forming a plurality of support regions acting on the energy accumulator unit 17 subject to the force effect. To this end, the cross sectional profile of the stop element 3 in the area forming the abutment face 5 is characterized by at least one L shaped, for example, C or U shaped design. This design makes possible, as a function of the design of the cross sectional profile of the stop element 3, preferably an almost symmetrical support of the energy accumulator units 17 on their outer extension, facing in a radial direction in the installation position, —that is, on the arrangement's outside diameter of the energy accumulator units—and their radially internal extension of the energy accumulator units 17—that is, on the arrangement's inside diameter of the energy accumulator units 17—as well as in the radial direction in the installation position. As a result, said abutment face maps in essence the contour of the guide channel 18 having slightly smaller dimensions. Due to the curved contour of the abutment face 5, the stop element 3 forms a guide channel 31 for the driver elements of the damper parts 30.2, in particular, the output part 14 configured as the flange 23. The guide channel extends in the circumferential direction and empties at the mutually facing end regions 17.1b and 17.2a of the energy accumulator units that are arranged one after the other in the circumferential direction of the device 1.

The C shaped design of the abutment and/or support region 7 offers the advantage that in this case the flange tongue 24 can also extend to the greatest extent possible over the entire diameter of the individual spring unit of the energy accumulator unit 17.

Figure 2:
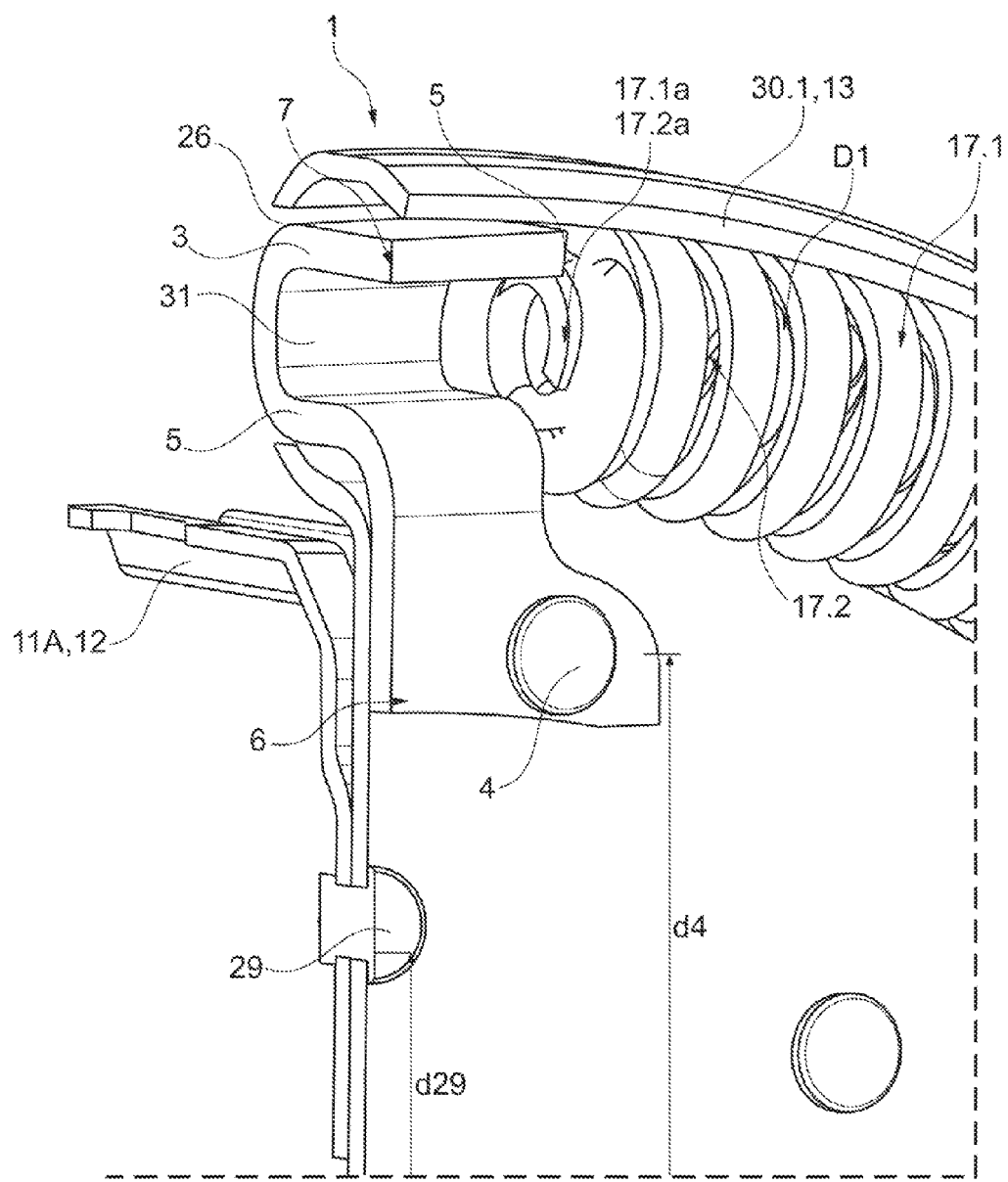
FIG. 2 is a perspective view of a detail from the design in FIG. 1.

In the design, shown in FIGS. 1a to 1d and thereafter in the detail view depicted in FIG. 2, the stop element 3 is connected in a torsion proof manner in an advantageous way directly to the damper part 30.1 forming the guide channel 18, —in this case, to the damper input 2, in particular the input part 13 of the first damper arrangement D1. The torsion proof connection bears the reference numeral 4. This torsion proof connection is designed in an advantageous way as an unreleasable form locking connection—in particular, a riveted connection. The stop element 3 is constructed as a formed sheet metal part with a contour that is adapted to the greatest extent possible to the cross sectional area of the energy accumulator 17. To this end, the cross sectional profile, viewed in an axial section in the circumferential direction, is characterized by an essentially L shaped, preferably C or U shaped design that forms the respective contour of the abutment face 5 on the energy accumulator unit 17. The stop element 3 has not only the stop and/or support region 7, but also a connecting region 6, in which the torsion proof connection 4 with the damper input 2 is arranged. The stop element 3 is formed as a sheet metal formed part in such a manner that there is always an adequately large stop face for taking along the spring package forming the energy accumulator unit 17. In order to arrange the abutment face 5 in the circumferential direction of the energy accumulator unit 17 as far as possible in the region of the outer circumference, the stop and support region 7 of the stop element 3 that forms the abutment face 5 is arranged so as to be integrated in the guide channel 18. In this case this guide channel extends into and through the recesses/breakthroughs 26 on the damper part 30.1, said recesses/breakthroughs being formed by means of the reach of the stop element 3 in the circumferential direction. In the region of the breakthroughs the stop element 3 maps the contour of the wall of the damper part 30.1.

In an example embodiment, the damper part 30.1 forming the guide channel 18 is formed by a driver disk 8, which extends in a radial direction and is formed in the region of its outer circumference in such a way that said driver disk describes in essence the guide channel 18, in that it surrounds the energy accumulator units 17 in the circumferential direction. The second damper part 30.2, which is formed by a flange 23, is arranged coaxially to the driver disk 8 and arranged so as to be spaced apart in an axial direction. In this case, the flange 23 is characterized in essence by an annular base element, on which is provided the flange tongues 24, which form the impingement areas II and which are configured in the form of projections that extend in an axial direction and, for example, are integral with the base element or can be mounted separately thereon. The projections, forming the flange tongues 23, are at an angle to the radial direction. That is, they extend preferably in the axial direction while simultaneously forming the impingement area II in the form of an abutment face 25 to the annular base element. The flange 23 is arranged in a radial direction inside the reach of the driver disk 8. In this case the stop element 3 is mounted directly on the driver disk 8. In so doing, the stop face 5 extends around the flange tongue 24.

The stop element 3 is arranged in the intermediate space 32 that is formed in the axial direction between the driver disk 8 and the flange 23. In so doing, the end side 8.2 of the driver disk 8 that points toward the flange 23 and that points away from the connecting element of the shiftable clutch system 11 forms an axial abutment face 27 for the connecting region 6, in particular the mounting flange region 28 forming said connecting region. This possibility offers the advantage that in this case the stop element 3 is totally integrated into the axial intermediate space 32 between the damper parts 30.1, 30.2 or more specifically the damper input 2 and at least the output part 14 of the first damper arrangement D1. Additional design space is not necessary. In this case the driver disk 8 can be formed, when viewed in the cross section, in a relatively simple way. The torsion proof connection 29 with the multi-disk carrier 12 is offset in a radial direction—that is, arranged on a different diameter d29. This diameter is smaller than the arrangement diameter d4 for the torsion proof connection 4.

Furthermore, FIG. 1a shows the individual support regions, which are marked with an X and are formed by the abutment face 5.

FIG. 1b is a view from the right according to FIG. 1a of the device 1 for damping vibrations. This figure shows the damper parts 30.1 and 30.2 in the form of the driver disk 8, forming the input part 13; and the flange 23, forming the output part 14; the energy accumulator units 17 as well as the engagement of the flange tongues 24 with the connecting channel 31. Since the device 1 involves a rotatable component, which is generally configured so as to be rotationally symmetrical, so that a plurality of energy accumulator units 17 are connected one after the other in the circumferential direction; and, therefore, a plurality of stop elements 3 are also provided, the reference numerals and symbols are used only once to mark components and to some extent different components exhibiting an identical design for the sake of a better overview. This also applies to the other views in FIGS. 1c and 1d.

FIG. 1c shows the design of the driver disk 8, in particular in a view of the end side 8.1 with the mounted multi-disk carrier 12 in a view from the left according to FIG. 1a.

FIG. 1d is a view of the end side 8.2 of the driver disk 8. The figure shows the individual torsion proof connections 4 between the individual stop element 3 and the driver disk 8, the stop element 3 and the energy accumulator units 17 that are arranged in-between. The figure does not show the flange 23. This flange, in particular the flange tongue 24, is to be arranged on the diameter that is characterized by the shape of the abutment face 5. The stop element 3 is formed, as stated above, as a sheet metal part, which is configured and/or formed in the shape of a C, when viewed in the cross section in an axial direction. The formed sheet metal part forms a connecting channel 31, which is oriented in the circumferential direction and which is arranged inside the guide channel 18. The flange tongue 24 can be guided in this guide channel.

FIG. 2 is a perspective view of an enlarged drawing from a detail of a device 1 for damping vibrations, in order to show the design and arrangement of the individual stop element 3. The drawing shows the driver disk 8, furthermore, the recess 26 provided therein, the stop element 3 with its formed design in the stop and/or support region 7, the connecting channel 31, which is formed by the stop and/or support region 7. The flange 23, in particular the flange tongue 24, can be guided in this connecting channel without making contact with it. Furthermore, the drawing shows the torsion proof connection 29 of the driver disk 8 with the shiftable clutch system 11, in particular with the multi-disk carrier 12 of the second clutch member 11A.

Figure 3:
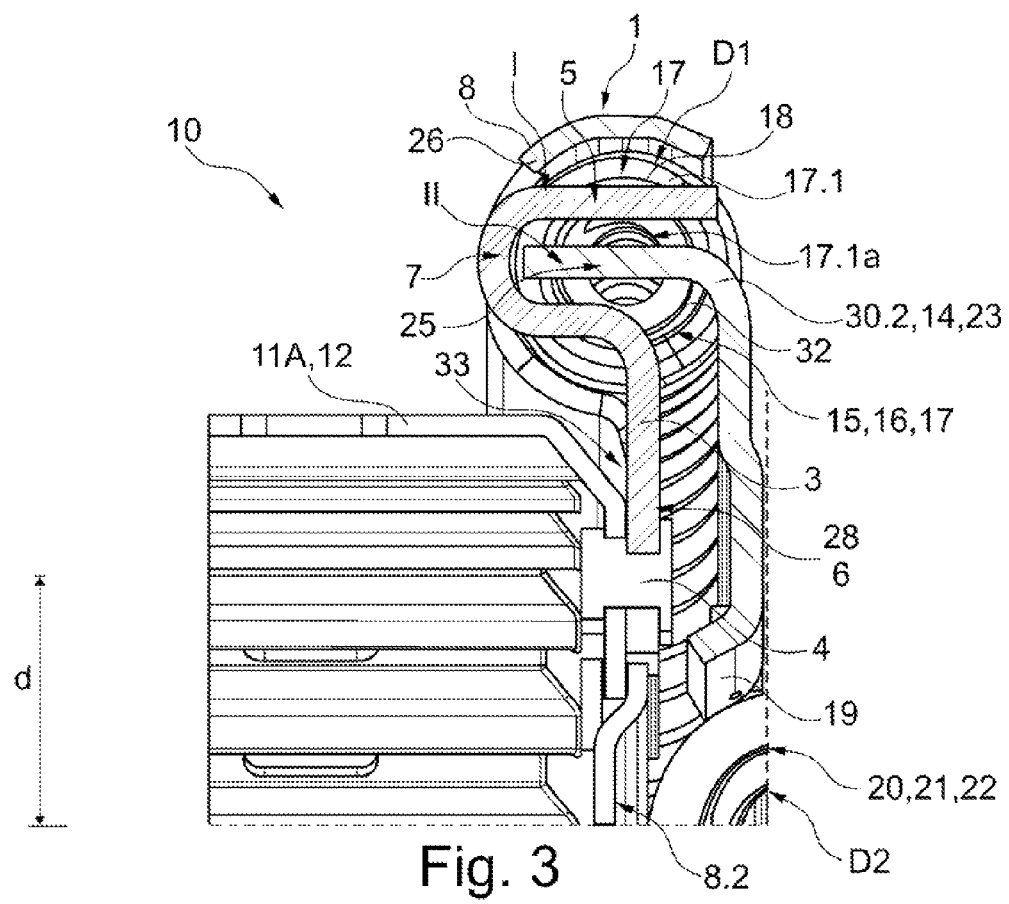
FIG. 3 is an axial view depicting an inventive device for damping vibrations.
Figure 4:
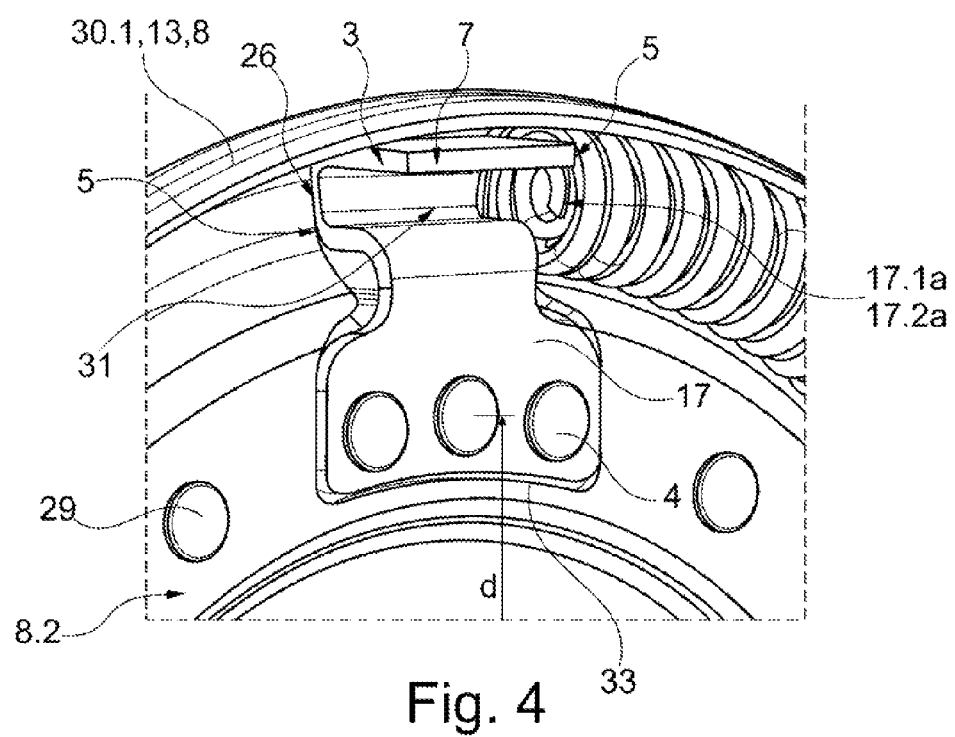
FIG. 4 is a perspective view of a detail from the design in FIG. 3.

FIGS. 1 and 2 show designs, in which the stop element 3 is arranged in an advantageous manner in the intermediate space 32 between the two damper parts 30.1 and 30.2 with a direct mounting on the damper part 30.1, which is configured as the driver disk 8 and forms the guide channel 18. The designs require consideration in the axial reach of the intermediate space 32. In an example embodiment, two different process steps are used when the torsion proof connections 4 and 29 are implemented as a form locking connecting, especially as riveted connections. FIGS. 3 and 4 show an alternative design, in which the stop element 3 is mounted, for example, directly on a component that is connected in a torsion proof manner to the damper part 30.1, in order to reduce the axial size and to make it possible to achieve both torsion proof connections 4 and 29 in one working step.

Working on this basis, FIG. 3 shows an alternative connection of an inventive stop element 3, which can be used in a manner analogous to the design of the connecting and support region 7, for supporting the spring units as the energy accumulator units 17 in FIGS. 1 and 2. In this context the basic design of the stop element 3 and the design of the connecting region 6, of the stop and/or support region 7 correspond in essence to those described with respect to FIGS. 1a to 1d and 2. However, owing to the mounting of the connecting region 6 directly on the multi-disk carrier, the stop element 3 is formed on the radially internal abutment area of the abutment face 5 with a shorter reach in the axial direction.

Furthermore, the basic construction of the force transmitting device 10 corresponds in essence to that described with respect to FIGS. 1a to 1d and 2, for which reason the same reference numerals and symbols are used for identical elements. In this case too, the stop and support region 7, assuming the stop function, is integrated into the guide channel 18 and additionally is incorporated into the recesses/breakthroughs preferably by way of the recesses/breakthroughs 26 that are arranged on the driver disk 8. However, in this case, the stop element 3 is not connected directly to the driver disk 8, in particular the end side 8.2, but rather indirectly to an element—that is, the multi-disk carrier 12—that is coupled in a torsion proof manner to said end side. For this purpose, the connecting region 6 is guided through the breakthroughs/recesses 33 on the damper part 30.1, for example, the driver disk 8. In this case the drawing shows the region for the torsion proof connection 4 of the connecting region 6 of the stop element 3 to the multi-disk carrier. The recesses/breakthroughs 33 on the driver disk 8 are configured in such a way that they are capable of totally accommodating and integrating the stop element 3, so that in this case the connecting region 6 lies virtually in an axial plane with the driver disk 8, in particular with the wall that is formed by this driver disk. To this end, the breakthroughs/recesses 33 also form the breakthroughs/recesses 26. When viewed in the circumferential direction, as in the case in FIG. 4, by means of a detail from a perspective view according to FIG. 3, the arrangement of the torsion proof connections 4 and 29 alternate in the circumferential direction. In an example embodiment, the torsion proof connection 4 between the stop element 3 and the multi-disk carrier 12 and/or the driver for the multi-disk carrier 12 as well as the torsion proof connection between the driver disk 8 and the multi-disk carrier and/or the driver 8 for the multi-disk carrier 12 are arranged on a common arrangement diameter d. In this case, too, the driver disk 8 is designed in a manner analogous to the design that has already been described above with respect to FIGS. 1 and 2, so that this driver disk partially defines at least a ring shaped channel in the region of the driver disk's outer circumference in the circumferential direction. That is, it forms the wall for this channel that corresponds to the guide channel 18 and serves not only to accommodate the energy accumulator units 17 of the integration of the stop elements 3, but also to accommodate the driver regions, in particular the flange tongues 24 of the flange 23 of the output part 14 of the damper arrangement 1. In this case, too, the flange 23 is provided as a disk shaped element with projections, as the flange tongues 23, that are axially oriented in a region of the outer circumference. Said flange tongues are arranged so as to be spaced apart from one another in the circumferential direction and form the impingement areas II, which form the stop faces 25 and which are provided for introducing and transmitting the force. The angular shape of the stop element 3 in the stop and support region 7 allows a quasi mapping of the contour of the driver disk 8 without hardly any significant narrowing of the guide channel 18. Therefore, the curved design results in a very large abutment face 5 for the energy accumulator units 17 in the circumferential direction, but simultaneously a connecting channel 31 for the flange tongues 23 is also provided. The flange tongues 24 can extend in essence over the entire reach of the ring shaped guide channel 18 in the axial direction.

Figure 5:
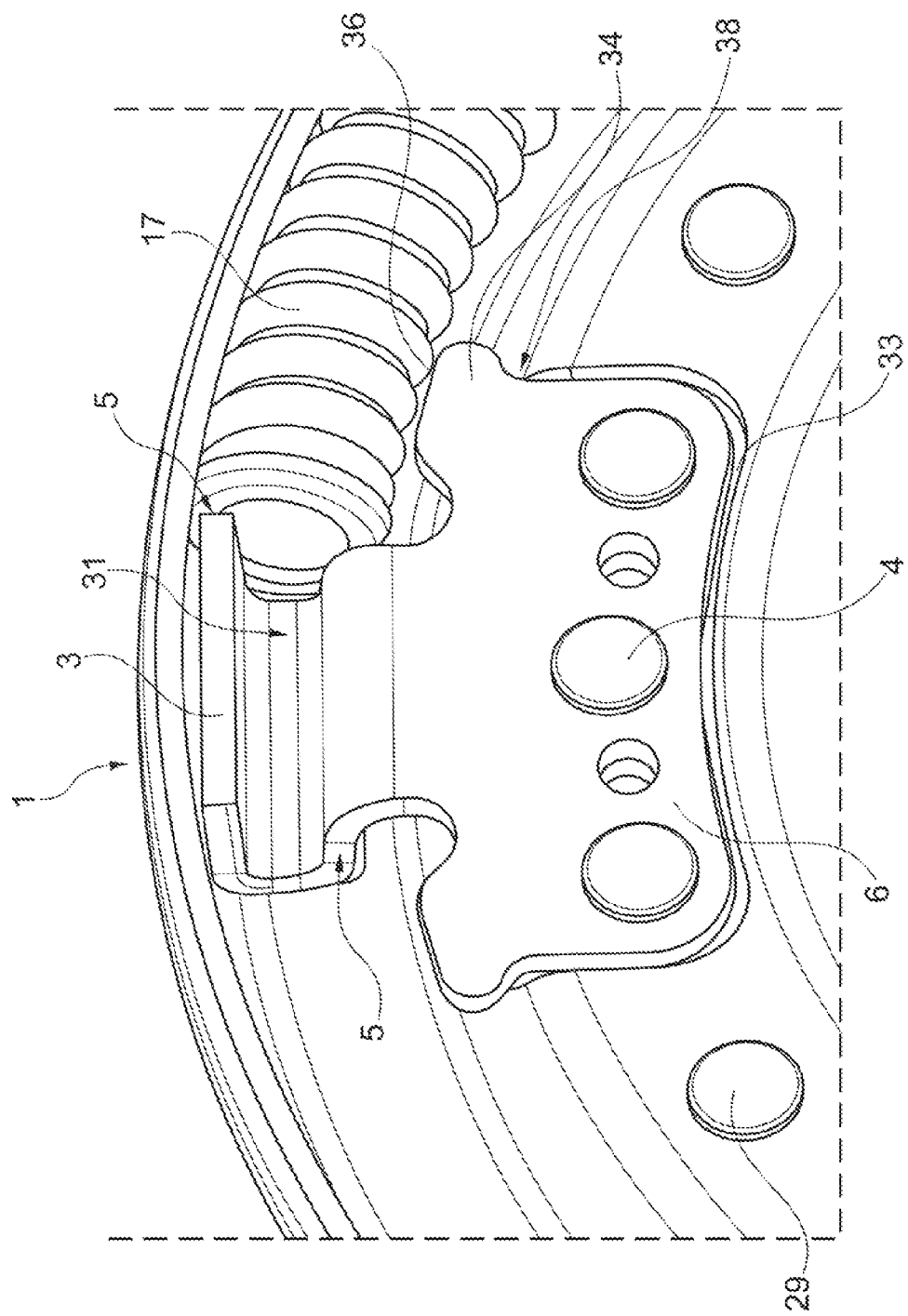
FIG. 5 is a perspective view of a detail of an inventive device for damping vibrations.

FIG. 5 shows an additional embodiment of the device (1) according to the invention. The stop element (3) exhibits radially below the energy accumulator unit (17) a support means (34), which forms a support region (36) and which can affect a radial support of the energy accumulator unit (17). This support means (34) is an integral part of the energy accumulator unit (17) and is arranged in a circumference sided end region (38) of the stop element (3).

The solution according to the invention is not limited to the designs depicted in FIGS. 1 to 5. Further developments, the design of the stop element 3, and its connection are within the scope of the present inventive idea.

LIST OF REFERENCE NUMERALS AND SYMBOLS 1 device for damping vibrations
2 damper input
3 stop element
4 torsion proof connection
5 abutment face
6 connecting region
7 stop and/or support region
8 driver disk
8.1, 8.2 end sides
9 outer circumference
10 force transmitting device
11 shiftable clutch system
11a second clutch member
12 multi-disk carrier
13 input part
14 output part
15 means for transmitting the torque
16 means for coupling the damping
17 energy accumulator unit
17.1 external spring unit
17.2 internal spring unit
17.1a, 17.2a end region
17.1b, 17.2b end region
18 guide channel
19 input part of the second damper arrangement
20 means for transmitting the torque of the second damper arrangement
21 means for coupling the damping of the second damper arrangement
22 energy accumulator unit of the second damper arrangement
23 flange
24 flange tongue
25 abutment face
26 breakthrough/recess
27 abutment face
28 flange mounting region
29 torsion proof connection
30.1 first damper part
30.2 second damper part
31 guide channel
32 axial intermediate space
33 breakthrough/recess
34 support means
36 support region
38 end region
D axis of rotation
I, II impingement region
d, d4, d29 arrangement diameter

What we claim is:

1. A device for damping vibrations with at least one damper arrangement, comprising:
- an axis of rotation;
- a first damper part including:
  - an outer circumferential portion including an inner surface and an oppositely facing outer surface;
  - a space partially enclosed by the inner surface; and,
  - a plurality of openings penetrating the material forming the first damper part and connecting the inner and outer surfaces;
- a second damper part including an abutment face, the second damper part arranged coaxially with respect to the first damper part and rotatable relative to the first damper to a limited extent in the circumferential direction;
- a stop element coupling said first and second damper parts to each other, fixed to the first damper part, at least partially disposed within the space, extending, in a direction parallel to the axis of rotation, from the space through the inner surface into an opening from the plurality of openings, and including first and second impingement areas; and,
- at least one first spring unit engaged with the first and second impingement areas and with the abutment face, wherein:
  - the first damper part forms a guide channel in which the at least one first spring unit is at least partially disposed; and,
  - the abutment face extends axially beyond the at least one first spring unit toward the opening.

2. The device, as claimed in claim 1, wherein the individual abutment face is configured relative to the cross section of the guide channel viewed over a subarea thereof so as to extend in the circumferential direction.

3. The device, as claimed in claim 1, wherein the stop element is constructed as a sheet metal formed part.

4. The device, as claimed in claim 1, wherein the stop element forms two abutment faces that are oriented opposite each other in the circumferential direction.

5. The device as claimed in claim 1, wherein the openings are spaced apart from each other in the circumferential direction, in the region forming the guide channel.

6. The device as claimed in claim 5, wherein the stop and support region is configured so as to be adapted to the contour of the wall of the first damper part that is missing in these regions, said first damper part forming the guide channel for the at least one first spring unit.

7. The device as claimed in claim 1, wherein the stop element is connected in a torsion proof manner directly to the damper part forming the guide channel for the at least one first spring unit.

8. The device, as claimed in claim 7, wherein the connecting region of the stop element forms an abutment face for resting against the first damper part.

9. The device as claimed in claim 1, wherein the stop element is connected in a torsion proof manner to a component which is connected in a torsion proof manner to the first damper part.

10. The device, as claimed in claim 9, wherein the openings are arranged in order to arrange the connecting region of the stop element in an axial plane with the first damper part.

11. The device as claimed in claim 9, further comprising torsion proof connections between the stop element and the component, which is connected in a torsion proof manner to the first damper part, and a torsion proof connections between the first damper part and the component, which is to be connected in a torsion proof manner to said damper part, ensuing on a common arrangement diameter.

12. The device as claimed in claim 1, further comprising torsion proof connections configured as riveted connections.

13. The device, as claimed in claim 12, wherein individual riveted connections are formed by respective rivet pins, which are formed or drawn into components that are to be connected together.

14. The device as claimed in claim 1, wherein the first damper part, is formed by an input part of a damper arrangement in the force flow.

15. The device, as claimed in claim 14, wherein the input part of a damper arrangement forms an input of the device.

16. The device as claimed in claim 1, wherein the second damper part is configured as a flange, exhibiting flange tongues, which are formed by projections oriented in an axial direction and can be guided so as to engage in a connecting channel, formed by the stop element.

17. The device as claimed in claim 1, wherein the at least one first spring unit is formed by bow springs.

18. The device as claimed in claim 1, wherein the at least one first spring unit is formed by spring units.

19. The device, as claimed in claim 18, wherein the at least one first spring unit is formed by spring units, comprising two spring units that are arranged inside each other.

20. The device, as claimed in claim 18, wherein the stop element comprises support means, forming a support region, for radially supporting the at least one first spring unit.

21. The device as claimed in claim 1, further comprising a plurality of damper arrangements which are connected in series and/or in parallel.

22. A device for damping vibrations with at least one damper arrangement, comprising:
- an axis of rotation;
- a first damper part including a space partially enclosed by an outer circumferential portion of the first damper part, and including a plurality of openings passing through the material forming the first damper part;
- a second damper part including an abutment face, the second damper part arranged coaxially with respect to the first damper part and rotatable relative to the first damper to a limited extent in circumferential direction defined by a circular line at a fixed distance from the axis of rotation;
- a stop element coupling said first and second damper parts to each other, fixed to the first damper part, at least partially disposed within the space, extending from the space into an opening from the plurality of openings, and including first and second impingement areas; and,
- a plurality of first spring units located at a first radial distance from the axis of rotation in a direction perpendicular to the axis of rotation and including respective first and second ends engaged with the first and second impingement areas and with the abutment face, wherein:
  - the first damper part forms a guide channel in which the at least one first spring unit is at least partially disposed;
  - the respective first and second ends are free of engagement with the first damper part in the circumferential direction; and,
  - every first spring unit at the first radial distance is engaged with the first and second impingement areas or with the abutment face.

23. A device for damping vibrations with at least one damper arrangement, comprising:
- an axis of rotation;
- a first damper part including a space partially enclosed by an outer circumferential portion of the first damper part, and including a plurality of openings penetrating the material forming the first damper part;
- a second damper part rotatable relative to the first damper to a limited extent in a circumferential direction defined by a circular line at a fixed distance form the axis of rotation, and including an abutment face;
- a stop element fixed to the first damper part and including:
  - a first impingement area aligned in an axial direction parallel to the axis of rotation and separated from the first damper part by a first space in a radial direction orthogonal to the axis of rotation;
  - a second impingement area aligned in the axial direction, aligned with the first impingement area in the radial direction, and separated from the first damper part by a second space, not including the first space, in the radial direction;
  - a portion at least partly disposed in an opening from the plurality of openings and connecting the first and second impingement areas, and,
  - a third space between the first and second impingement areas and partly formed by the portion of the stop element; and,
- a plurality of first spring units located at a first radial distance from the axis of rotation in a direction perpendicular to the axis of rotation and with respective first and second ends engaged with the first and second impingement areas and with the abutment face, wherein:
  - the first damper part forms a guide channel in which the at least one first spring unit is at least partially disposed;
  - every first spring unit at the first radial distance is engaged with the second damper part or the stop element; and,
  - the abutment face is disposed in the third space and is aligned with the first and second impingement areas in the radial direction.

* * * * *